United States Patent [19]

Chronberg

[11] 4,312,825

[45] Jan. 26, 1982

[54] METHOD AND DEVICE FOR CUTTING AND SHAPING A SHEET OR SLAB OF PASTE BASED IN PARTICULAR ON CLAYS FOR MAKING CERAMIC OBJECTS

[76] Inventor: Sten Chronberg, 8, rue Leon Marchand, Arnieres-sur-Iton, France

[21] Appl. No.: 167,916

[22] Filed: Jul. 11, 1980

Related U.S. Application Data

[63] Continuation of Ser. No. 952,148, Oct. 17, 1978, abandoned, which is a continuation of Ser. No. 775,622, Mar. 8, 1977, abandoned.

[30] Foreign Application Priority Data

Mar. 11, 1976 [FR] France ................................ 7607015

[51] Int. Cl.$^3$ ............................................. B29C 17/10

[52] U.S. Cl. ..................................... 264/153; 264/163

[58] Field of Search .......................... 264/67, 153, 163

[56] References Cited

U.S. PATENT DOCUMENTS 2,966,719 1/1961 Park ..................................... 264/67

*Primary Examiner*—John A. Parrish
*Attorney, Agent, or Firm*—Steinberg & Raskin

[57] ABSTRACT

A method of cutting and shaping a sheet or slab of soft, tearable and scalable paste, constituted for example by agglomerated solid or plastic particles, based in particular on clays, for the manufacture of ceramic objects or pieces, said objects being cut out of a slab portion constituting a blank by means of suitably contoured cutters which are caused to penetrate into the said paste laid on a bearing support having the desired shape, after which the trimmings are removed.

In order to allow the objects cut out of the said blank to be recovered, the said cutting is performed on a supple film or hand laid on the said support, for example a plastic film or sheet, which is apt to conform in shape to the objects cut out, which does not adhere to the said objects and which is not cut by the said cutters, the objects thus cut out being thereafter separated from the said supple band.

8 Claims, 15 Drawing Figures

METHOD AND DEVICE FOR CUTTING AND SHAPING A SHEET OR SLAB OF PASTE BASED IN PARTICULAR ON CLAYS FOR MAKING CERAMIC OBJECTS

This is a continuation, of application Ser. No. 952,148, filed Oct. 17, 1978, which is a continuation of Ser. No. 775,622, Mar. 8, 1977, abandoned.

The present invention relates essentially to a method for cutting and shaping a sheet or slab of soft, tearable and scalable paste, constituted for example by agglomerated solid or plastic particles, based in particular on clays, for making ceramic objects, the said objects being cut out of a blank constituted by a portion of the said slab by means of suitably contoured cutters which are caused to penetrate into the said paste laid on a bearing support having the desired shape, the resulting trimmings being thereafter removed.

By such a method, objects having the desired dimensions and shape can be cut out of a slab of larger dimensions, the said objects being thereafter fired or baked into glazed tiles, dishes and generally all kinds of finished ceramic products or ware.

One of the essential difficulties encountered is that, the paste being friable, it is relatively difficult to be cut and therefore still more difficult to be shaped without spoiling the object. This leads to very delicate handling and quite extensive waste which considerably increase manufacturing costs and adversely affect the quality of the finished products. One of the purposes of the invention is to overcome this difficulty involved in the cutting and shaping processes.

To this end, the invention provides a method in which, in order to allow the objects cut out of the slab blank to be readily recovered, the said cutting is performed on a sheet-like film or a supple band, for example a plastic film or sheet, laid on the bearing support, the said supple band being so selected as to conform in shape to the objects cut out but not to adhere to the pasty material and not to be cut by the cutters, thus allowing the objects cut out to be separated from the said band without being spoiled.

According to another feature of the method of the invention, the objects cut out being substantially flat and having to be thereafter processed in a kiln on firing or baking plates, the said objects are transferred onto the said firing plates by being conveyed thereto on the said supple band.

Owing to the method of the invention and as will appear more clearly from the description that will follow, utmost facilitation of the handling is obtained and the risks of deterioration of the objects cut out are considerably reduced.

The method according to the invention can be readily automated or semi-automated. To this end the invention provides a device for carrying out the above-mentioned method, characterized in particular in that it comprises : a movable frame or drawer provided with the said supple band and displaceable on a bearing surface, the said bearing surface including a blank pressing counter-plate on which the cutting of the blanks takes place and a firing or baking plate on which the objects cut out are deposited in order to be subsequently fired in a kiln, the said frame being movable between two positions, in one of which the said band is located substantially above the blank pressing counter-plate whereas in the other position the said band is located substantially above the firing plate, the said device furthermore including a retractable or move-aside stop member above the said bearing surface between the said pressing counter-plate and the said firing plate.

The invention will appear more clearly from the following description with reference to the appended drawings wherein.

Reference is first made to FIGS. 1 to 8.

Figure 8:
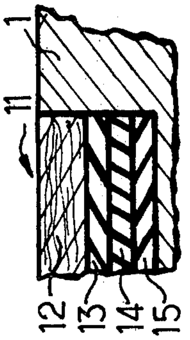
FIG. 8 is an enlarged sectional view of the encircled portion VIII of FIG. 3.

According to the form of embodiment illustrated in these Figures, a device for cutting a slab constituted for example by agglomerated clay particles for the manufacture of ceramic objects comprises essentially a carriage 1 movable along guide rails 2 through the medium of rollers 3 between end stops 4, 5 provided on the rails 2. The carriage has an upper supporting or bearing surface 6 in which are provided three cavities 7, 8 and 9. The cavity 7 accommodates a firing or baking plate 10. The cavity 8 receives a pressing counter-plate 11 which, in the example illustrated and as seen more clearly in FIG. 8, is constituted by an upper plywood layer 12 and three layers 13, 14 and 15 of, for example, foam rubber ensuring good pressure absorption during the cutting of the blanks by the punch-out tool 16 (FIG. 2) as will be described later.

The cavity 9 accommodates three rolls or bars 17, 18, 19. The two upper rolls 17, 19 are arranged quite close to one another and so that their upper generatrix is flush with the plane of the bearing surface 6 of carriage 1. The roll 18, on the contrary, is entirely located below that plane.

Figure 7:
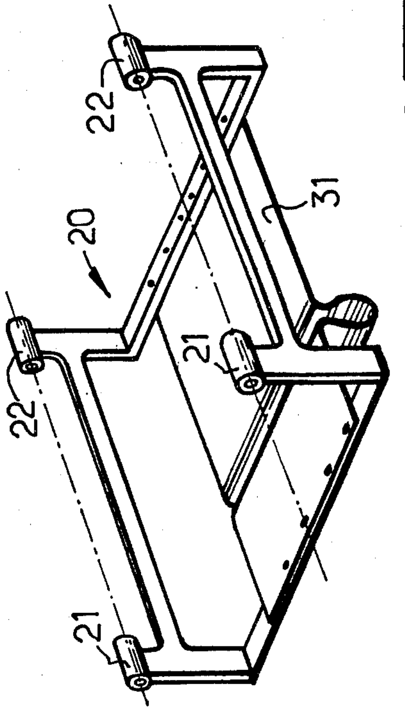
FIG. 7 is a perspective view of the movable frame or drawer of the device illustrated in the foregoing Figures.

On the carriage 1 is placed a movable frame or drawer member 20, the shape of which appears more clearly in FIG. 7. It is provided with a sheet or film defining a supple working band or strip 31 which passes over the rolls 17, 19 and under the roll 18 acting as deflecting means as will appear later. The said supple working band is advantageously constituted by a sufficiently supple and strong fabric or like material, e.g. of the "oil cloth" type.

The movable frame is provided with travel limiting stops 21, 22, respectively, which, in the end positions of the movable frame, abut against corresponding opposite stops 23, 24 provided on the carriage 1. Furthermore a retractable or move-aside stop plate 25, the function of which will appear later, is provided above the bearing surface 6 of the carriage between the pressing counter-plate 11 and the firing plate 10.

The operation and use of the device will now be described with reference to FIGS. 1 to 8.

Figure 1:
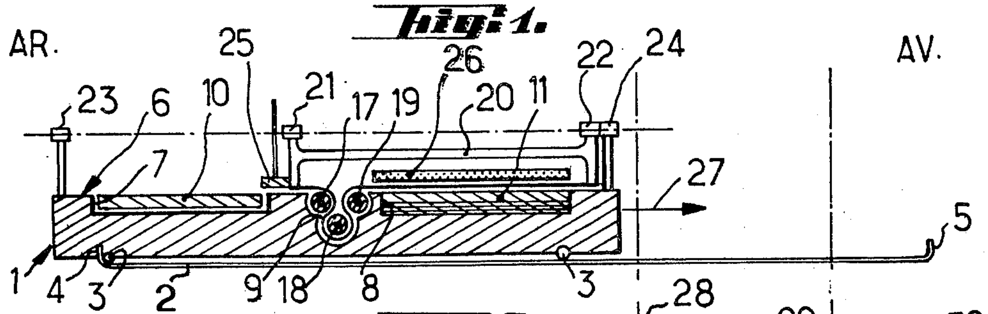
FIGS. 1 to 5 are diagrammatic vertical sectional views of a device for cutting objects out of a slab blank and transferring the said objects onto firing plates, these figures corresponding to various steps of the method of the invention.

Referring to FIG. 1 and, in order to facilitate the description, considering the "rear" side to be the left-hand side designated by AR in FIG. 1 and the "front" side to be the right-hand side designated by AV in the same Figure, the carriage 1 is shown to be in its rear position in which the rollers 3 abut against the rear stops 4 of the rails 2.

The movable frame 20, on the contrary, is pushed forward to its front position in which the stops 22 abut against the stops 24 of the carriage 1.

A free firing or baking plate 10 is placed in the cavity 7 of the carriage.

A blank 26 constituted for example by a portion of a slab of agglomerated clay particles is then placed on the working band 31 of the movable frame 20 and substantially above the pressing counter-plate 11.

The carriage is thereafter pushed forward in the direction of arrow 27 so as to move the pressing counter-plate 11 beyond the line 28 which can be materialized by a safety screen or curtain (not shown) of the cutting press.

Figure 2:
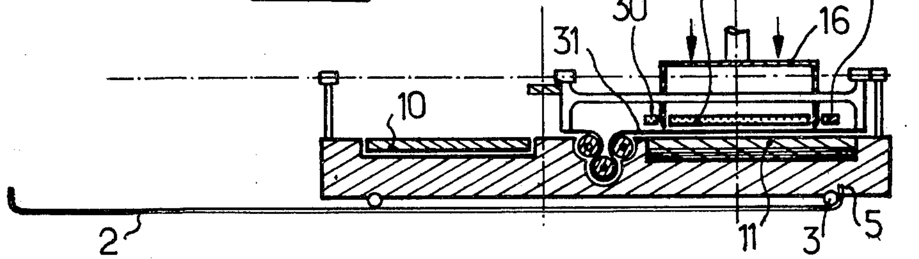

Reference is now made to FIG. 2 in which the carriage 1 is shown in its advanced position with its rollers 3 abutting against the front stops 5 of rails 2. At 16 is diagrammatized the press punch-out tool moved down into the blank 26, thus cutting pieces 29 out of the latter and resulting in trimmings 30 around the said pieces.

Thereafter the punch-out tool 16 of the press moves upwards.

Figure 3:
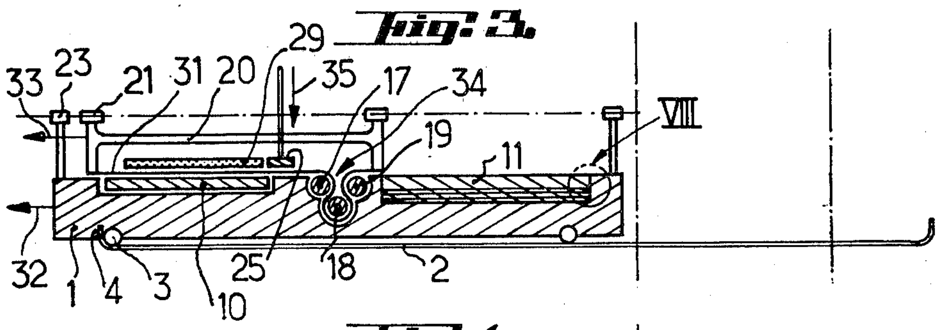

As illustrated in FIG. 3 and indicated by arrow 32, the carriage 1 moves back until its rollers abut against the rear stop 4 of rails 2.

Then the trimmings 30 are eliminated, e.g. withdrawn manually. In that position, the movable frame 20 is still in its advanced position (not shown in FIG. 3).

The movable frame 20 is then moved back as indicated by arrow 33 until its rear stops 21 abut against the stops 23 of the carriage. During this backward movement the objects 29 cut out and previously freed from the trimmings are transferred from the pressing counter-plate 11 to a location above the firing plate 10 by the supple working band 31 of the movable frame 20. During this transfer movement and owing to the deflecting means constituted by the three rolls 17, 18, 19, the working band 31 passes below the plane of the carriage bearing surface 6, on the narrow gap 34 comprised between the rolls 17, 19. During the transfer, this gap sweeps the objects 29 over their whole length, thus ensuring a first separation of the lower face of the pieces 29 from the upper face of the working band 31. This separation takes place progressively and linearly without spoiling the pieces.

In the rear position of carriage 1 illustrated in FIG. 3, the stop plate 25 is lowered as indicated by arrow 35.

Figure 4:
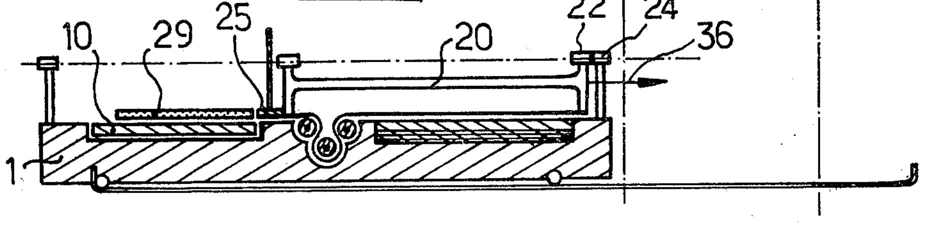

From that moment and as illustrated in FIG. 4, the movable frame 20 may be moved forward as illustrated by arrow 36 until the stops 22 of the frame 20 abut against the stops 24 of carriage 1. During this displacement of the frame 20, the cut-out pieces 29 retained against the stop plate 25 slide on the surface of the working band 31 and thus remain on the baking plate 10.

Figure 5:
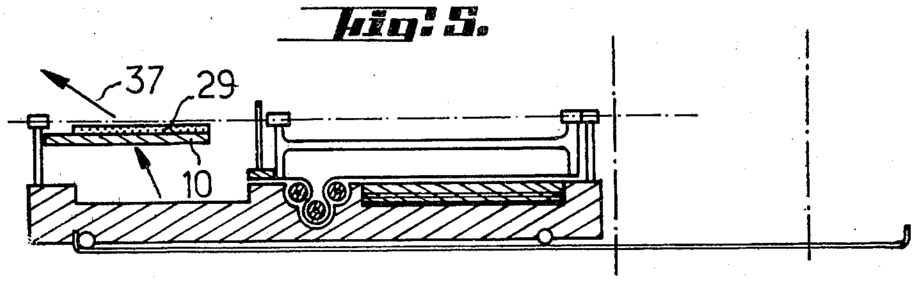
Figure 6:
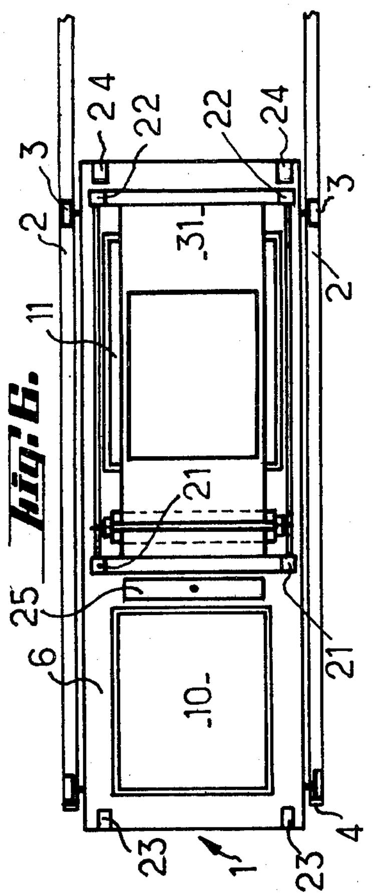
FIG. 6 is a top view of the device in its position illustrated in FIG. 1.

As illustrated in FIG. 5 by arrows 37, it is then sufficient to withdraw the firing plate 10 supporting the objects 29 for further treatment of the ceramic products in a kiln.

In the form of embodiment just described, the stop plate 25 moves jointly with the carriage 1 and can be raised or lowered vertically to fulfill its function as a stop as explained above without interfering with the operation of the carriage and the movable frame. Other types of retractable or move-aside means may of course be provided; for example the stop may be moved aside transversely by means of an actuating cylinder, or a system with a lateral hinge may be provided to fulfill the same function.

Figure 9:
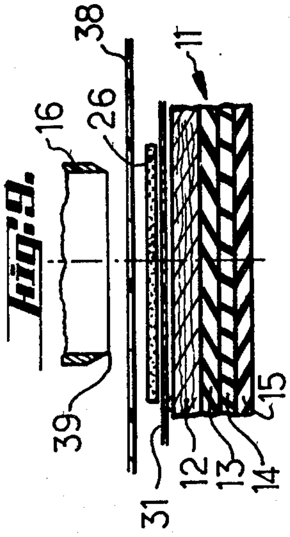
FIGS. 9 to 11 are diagrammatic vertical sectional views illustrating three steps of the process of cutting out objects with edges rounded off according to the invention.
Figure 10:
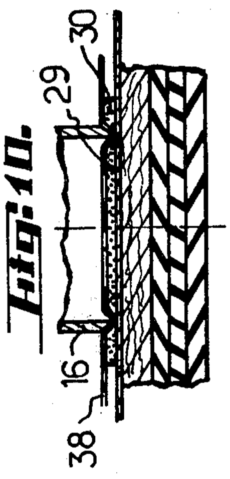
Figure 11:
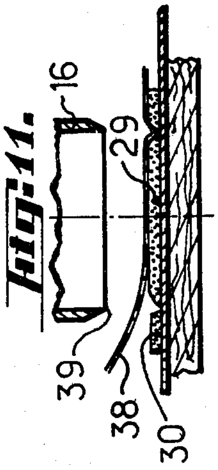

Reference is now made to FIGS. 9 to 11 illustrating a method and a device which, according to the invention, allows standardized production of objects such as for example ceramic tiles and rounded-off edges.

To this end, and as illustrated in FIG. 9, a sheet-like supple working band such as, for example, the band 31 described with reference to the foregoing Figures, is placed on the pressing counter-plate 11. On this band 31 is laid the blank 26 constituted by a portion of a slab of, for example, agglomerated clay particles. By means of a punch-out tool such as for example the press tool 16 shown in FIG. 1, pieces having the desired dimensions are cut out of the blank 26.

In order to provide the objects thus cut out with rounded-off edges, a supple sheet-like film 38 such as for example a thin polyethylene film is arranged, before the lowering of the tool, between the blank 26 and the punch-out tool 16.

The cutting edge 39 of tool 16 is sufficiently sharp to cut out the objects 29 (FIG. 10) during the lowering of the tool 16 onto the pressing counter-plate 11 and sufficiently blunt to avoid cutting the thin film 38. Besides, the pressing counter-plate 11 is so structured as to act as a buffer favouring the correct cutting out of the pieces 29 and the non-cutting of the film 38.

During the downward motion of the tool 16 into the blank 26, the film 38 (FIG. 10), owing to its inherent elasticity or flexibility, is driven along by the cutting edge 39 of the tool, thus exerting a pressure on the edges of the objects 29 and rounding off their angles as clearly shown in FIGS. 10 and 11. Since the film 38 is not cut by the tool edge 39, it is sufficient (FIG. 11), after having raised the tool 16, to remove the film 38 and eliminate the trimmings 30 to obtain the objects 29 with rounded-off edges.

Figure 12:
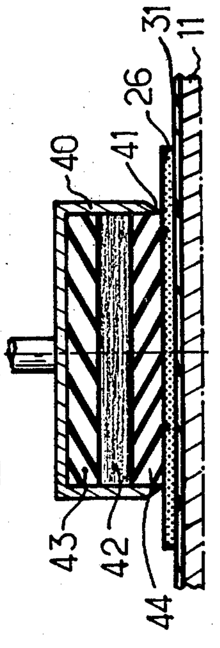
FIG. 12 is a vertical sectional view of a punch-out tool usable according to the invention.

If, unlike the form of embodiment of FIGS. 9 to 11, it is desired to obtain objects cut out with sharp angles, use can advantageously be made, as illustrated in FIG. 12, of a box-shaped punch-out tool 40 with a lower cutting edge 41 for cutting the blank 26 laid on the supporting band 31, itself supported by the pressing counter-plate 11. Within the box portion of the tool 40 is provided a pad 42, for example of felt impregnated with an appropriate lubricant, the said pad being applied against the inner wall of the tool 40 so as to continuously lubricate the internal wall of the cutting portion 41 to prevent the pasty material of the blank 26 from sticking within the tool 40. Furthermore, the lubricant-impregnated pad 42 may advantageously be placed between two layers of foam rubber or another compressible elastic material, the lower surface of the lower layer 44 being substantially flush with the plane of the cutting edge in the position of rest of the punch-out tool 40. Thus, when the punch-out tool is lowered into the blank 26 so as to cut the same, the layers 43, 42, 44 are compressed, allowing the piece being cut to penetrate into the punch-out tool, the internal wall of which is lubricated. During the following upward movement of the tool 40, the object cut out is easily ejected from the tool owing to the lubrication of the wall of the box 40 and to the elasticity of the layers 43, 44. This ensures a clear-cut edge of the objects out of the blank 26.

Advantageously, an elastic cushion, for example of foam rubber somewhat similar to the cushioning means constituted by the elastic layers 43, 44 of the tool 40 of FIG. 12 may be placed in the punch-out tool 16 of FIGS. 2 and 9 to 11, so as, in particular, to facilitate the extraction of the cut-out piece from the tool, the said elastic cushion being substantially on a level with the lower or cutting edge of the tool in its position of rest.

Figure 13:
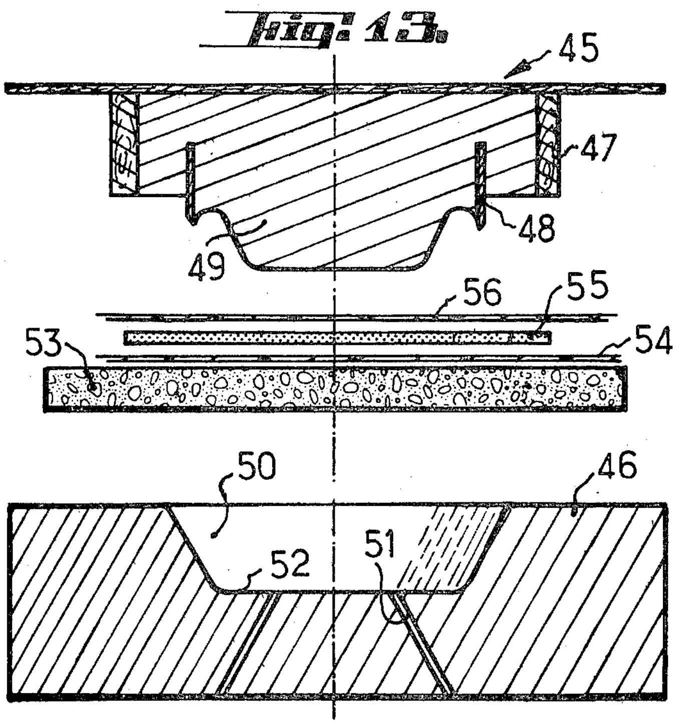
FIGS. 13 and 15 are diagrammatic sectional views illustrating three steps of a process for manufacturing objects cut out and formed according to the invention.
Figure 14:
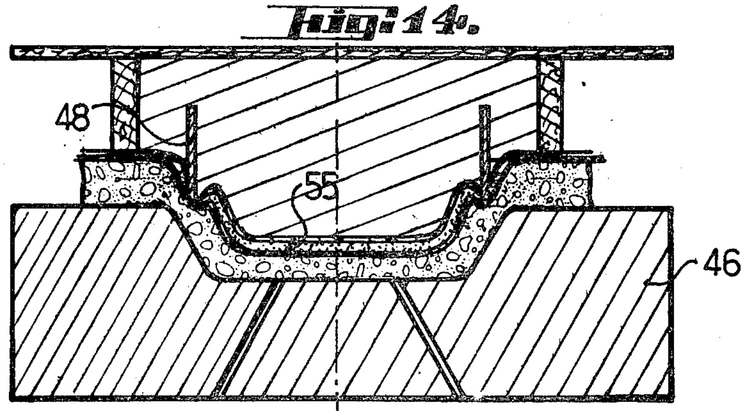
Figure 15:
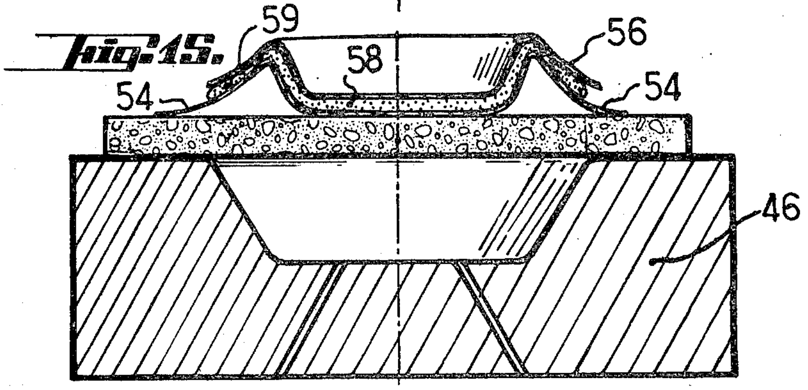

Referring now to the form of embodiment of FIGS. 13 to 15, there is illustrated a method of cutting and forming shaped, non-flat objects from a plane slab according to the invention.

The device allowing such a cutting comprises essentially a form constituting a punch 45 and a counter-form constituting a mating die 46.

The form 45 includes a supporting body 47 on which is mounted a cutter 48, the body 47 being provided with a suitable filling material 49, for example of plaster, plastics or light alloy.

The counter-form 46 is provided with a hollow 50 and vent passages 51 opening onto the surface 52 of the counter-form for reasons which will appear hereafter.

According to the method of the invention, a supple compressible support sheet 53, for example of rubber, is placed on the upper face of the counter-form 46.

On this layer of foam rubber 53 is placed a sheet-like supple band or film 54, for example of polyethylene. Over the latter is placed a blank 55 constituted by a portion of a slab of, for example, agglomerated clay particles. Over the blank 55 is placed a second thin supple film 56, for example of polyethylene.

As illustrated in FIG. 14, the form 45 is thereafter applied on the counter-form 46 until the counter-pressure of the pressing counterbalance the pressure of application of the press. In this position, as illustrated clearly in FIG. 14, there is left between the form and the counter-form a sufficient space to accommodate the supple compressible support 53 in the compressed state, as well as the blank 55 confined between the two films 54, 56, with the cutter 48 of the form driven into the pasty material of the blank 55, thus deforming the protective films 54, 56 without cutting them.

The mutual counter-balancing of the pressing pressure and the forming counter-pressure automatically ensures an adjustment of the press travel irrespective of the thickness of the blank 55.

Thereafter, it is sufficient to separate the form 45 from the counter-form 46. Under such conditions, and as illustrated in FIG. 14, the supple support band 53, owing to its elasticity and to the vent passages 51, straightens out on the counter-form 46, thus freeing on itself a cut-out and shaped non-planar object 58 with trimmings 59, the said object being protected between the two films 54, 56. The piece 58, for example a dish-shaped object, is then subjected to baking after the protective films 54, 56 are removed.

It is thus apparent that according to the method of the invention a slab of soft paste (26 or 55) is placed on a flexible film (31 or 54) while the latter rests on an elastic support (formed by the unit 11 or sheet 53), and then this slab is cut through to form a slab piece (29 or 58) of a given configuration as well as slab trimmings (30 or 59), the cutting action applied during cutting through the slab being such that the flexible film is not cut while the elastic support absorbs the cutting forces. After the slab has thus been cut through, the trimmings are removed and the slab piece is separated from the flexible film and then further treated.

Of course, the invention is by no means limited to the forms of embodiment and of carrying out described which have been given by way of example only. The invention comprises all the technical equivalents to the means described as well as their combinations should the latter be carried out according to its gist and used within the scope of the following claims.

What is claimed is:

1. In a method of manufacturing an article from a slab of soft paste, placing a flexible sheet on an elastic support comprising a supple, compressible layer to provide a good absorption of cutting forces, placing the slab of soft paste on sid flexible sheet while the flexible sheet rests on the compressible elastic support, said flexible sheet being formed of a material which does not adhere to the slab of soft paste, then cutting through the slab while the latter is located above the compressible elastic support to provide therefrom a slab piece of predetermined configuration as well as slab trimmings, the cutting through the slab being carried out with a cutting action which does not cut the flexible sheet while the forces of the cutting action are absorbed by the compressible elastic support, and after cutting through the slab removing the slab trimmings and separating the slab piece from the flexible sheet.

2. In a method as recited in claim 1, the steps of removing the flexible sheet with the slab piece thereon from the elastic support, transferring the flexible sheet with the slab piece thereon to a firing plate prior to separating the slab piece from the flexible sheet, said flexible sheet being situated between the slab piece and the firing plate and separating the slab piece and the flexible sheet from each other by withdrawing the flexible sheet in substantially parallel relationship to said firing plate, while maintaining a stop in engagement with the slab piece to prevent the latter from moving with the sheet during withdrawal thereof so that after withdrawal of the sheet the slab piece remains on the firing plate.

3. In a method as recited in claim 2 and including the step of guiding the sheet, during transfer of the sheet with the slab piece thereon to the firing plate, first downwardly out of engagement with and away from the slab piece and then upwardly back into engagement with the slab piece, so that prior to withdrawing the sheet from between the firing plate and slab piece, the sheet has been separated at least once from the slab piece.

4. In a method of manufacturing an article from a slab of soft paste, placing a first flexible sheet on an elastic support comprising a supple, compressible material layer to provide a good absorption of cutting forces, placing the slab of soft paste on said first flexible sheet while the first flexible sheet rests on the compressible elastic support, placing a second flexible sheet on the top of the slab, said first and second flexible sheets being formed of a material which does not adhere to the slab of soft paste, then cutting through the slab while located above the compressible elastic support to provide and form a slab piece of predetermined configuration including rounded edges as well as slab trimmings, the cutting through the slab being carried out with a cutting action which does not cut the flexible sheets while the forces of the cutting action are absorbed by the compressible elastic support, removing the second sheet from the slab subsequent to cutting through the slab, removing the slab trimmings and separating the slab piece from the first flexible sheet.

5. In a method as recited in claim 1 and including the step of cutting through the slab with a cutter which has an inner surface, and lubricating said inner surface of the cutter so that by way of said cutter the slab piece will have sharp edges.

6. In a method as recited in claim 5 and including the step of maintaining in the interior of the cutter an absorbent pad the edges of which are applied against the internal face of the cutter and containing a lubricate reserve, so that the lubricating of the inner surface of the cutter is achieved by way of said absorbent pad.

7. In a method as recited in claim 1 and including the steps of situating the elastic support over the hollow die, while also situating a second flexible sheet on top of the slab, and then carrying out the cutting action by introducing a punch at least partly into the hollow die with the punch engaging the second sheet and acting therethrough on the slab and the film situated between the latter and the elastic support, with the elastic support being introduced into the die in advance of the slab, and thereafter removing the punch from the die so that the resulting slab piece has a non-planar configuration, and then removing said resulting slab piece from both sheets.

8. In a method as recited in claim 1 and wherein said supple, compressible layer constitutes foam rubber or the like.

* * * * *

UNITED STATES PATENT AND TRADEMARK OFFICE
CERTIFICATE OF CORRECTION

PATENT NO. : 4,312,825

DATED : January 26, 1982

INVENTOR(S) : Sten Chronberg

It is certified that error appears in the above-identified patent and that said Letters Patent is hereby corrected as shown below:

On the title page item [73] Assignee :

--AGENCE NATIONALE DE VALORISATION DE LA RECHERCHE (ANVAR)-- should be inserted.

Signed and Sealed this

*Eighth* Day of *March 1983*

[SEAL]

*Attest:*

GERALD J. MOSSINGHOFF

*Attesting Officer* *Commissioner of Patents and Trademarks*